Oct. 13, 1964 J. A. ELLARD ETAL 3,152,961
STABILIZATION OF ORGANIC FLUIDS AGAINST RADIATION
DECOMPOSITION AND SYSTEMS EMPLOYING SAME
Filed Oct. 24, 1960

INVENTOR.
JAMES A. ELLARD
WILLIAM H. YANKO
BY
Lloyd B. Stevens, Jr.
ATTORNEY

United States Patent Office 3,152,961
Patented Oct. 13, 1964

3,152,961
STABILIZATION OF ORGANIC FLUIDS AGAINST RADIATION DECOMPOSITION AND SYSTEMS EMPLOYING SAME
James A. Ellard and William H. Yanko, Dayton, Ohio, assignors to Monsanto Company, St. Louis, Mo., a corporation of Delaware
Filed Oct. 24, 1960, Ser. No. 64,436
10 Claims. (Cl. 176—38)

This invention deals with systems employing radiation stable fluids and particularly improvements in the art of cooling and moderating a neutronic reactor and the utilization of new compositions especially suitable for heat extraction from and moderating purposes within a neutronic power reactor.

It has been known for some time that the isotope U-235, occurring in natural uranium to the extent of one part in 139 parts of natural uranium could be fissioned by bombardment with thermal neutrons, resulting in the production of two lighter elements having great kinetic energy, together with approximately two fast neutrons on the average together with beta and gamma radiation. Vast amounts of heat energy are liberated in this reaction, and the recovery and use of such heat has presented attractive possibilities as a use of nuclear power.

The practical generation and recovery of the "nuclear" or "atomic" derived heat was, of course, dependent upon the successful solution of the problem of safely inducing and controlling a self-sustaining chain reaction. As is well known to those skilled in the art, this problem was solved by arranging bodies of the fissionable material, usually uranium or enriched uranium in a geometric pattern within a mass of moderator in such fashion that a self-sustaining controliable chain reaction was obtained. The considerable amounts of heat generated in the bodies of fissionable material were removed either by cooling these bodies with a gas or with a suitable liquid. As a result there were developed two general types of neutronic reactors which came to be referred to as "gas-cooled" and "liquid-cooled" reactors.

For the purpose of recovering the heat liberated by the fission chain reaction and utilizing such heat in a heat engine of conventional type, the liquid-cooled reactor has received the greatest attention and it is with this type of reactor that this invention is concerned.

Methods for constructing and operating neutronic reactors for carrying out the chain reaction are well known in this art and are described, for example, by Fermi and Szilard in U.S. Patent No. 2,708,656, issued May 17, 1955. The descriptive matter of this patent is by reference incorporated herein and made a part of this disclosure. According to the disclosure of this patent, either light water ($H_2O$), heavy water ($D_2O$), or diphenyl (biphenyl) may be used as a moderator and coolant in the liquid-cooled reactor.

Attractive possibilities are presented by the use of biphenyl as a reactor coolant. The properties of this material, i.e., its relatively high boiling point at atmospheric pressure (225° C.), its chemical composition consisting only of carbon and hydrogen, and its thermal stability make possible the operation of reactors cooled with this material at temperatures as high as 425° C., or higher for extended periods of time. A major drawback encountered in the use of this material lies in its relatively high freezing (70° C.) or pour point, low boiling point (255° C.), and the fact that some polymerization takes place in the biphenyl as a result of radiolytic damage.

In copending application Serial No. 590,002, filed June 7, 1956, now U.S. 2,902,425, low pour point reactor coolants and moderators are described which are monoisopropylbiphenyls or mixtures of monoisopropylbiphenyls with biphenyl employing not in excess of 20% by weight of biphenyl in the mixture.

Copending application Serial No. 727,999, filed April 11, 1958, now abandoned, describes reactor coolants and moderators which have advantages over both biphenyl and monoisopropylbiphenyl. These materials are lower alkyl-o-terphenyls and lower alkyl-m-terphenyls or mixtures thereof. Not more than about 50% by weight of lower alkyl-p-terphenyls can be tolerated in admixture with the other isomers and still have sufficiently low pour point.

The surprising discovery has now been made that rosin acids are stabilizers for polycyclic aromatic hydrocarbons subjected to radiation such as alpha, beta, X- and gamma-rays, neutrons, etc. Upon to about an equal amount preferably not more than about 25%, by weight, of rosin acids can be added as a stabilizer to polycyclic aromatic hydrocarbons, but at least an amount sufficient to reduce the radiolytic damage, especially residue formation, in the polycyclic aromatic hydrocarbons by at least 15% is added. It has been found that tall oil is a particularly suitable source of rosin acids for use in the invention. Tall oil can be used per se or fractions thereof. Abietic acid derivable from either commercial rosin or tall oil is a very effective stabilizer. Also distillation residue fractions of tall oil are effective. It is preferred to use a minimum of about 2% rosin acids.

The polycyclic aromatic hydrocarbons usable in the radiation stable fluids of the invention can be polyphenyls, fused-ring aromatic hydrocarbons or mixtures thereof. Preferred polyphenyls include biphenyl, the terphenyls, the quaterphenyls, alkylation products thereof wherein 1 or 2 and only minor amounts of 3 or more lower alkyl groups are added, and mixtures thereof. Preferred fused-ring aromatic hydrocarbons include tricyclic, tetracyclic, preferably with only minor amounts of bicyclic aromatics, alkylation products thereof wherein 1 or 2 and only minor amounts of 3 or more lower alkyl groups are added, and mixtures thereof.

When the compositions of the invention are subjected to radiation, decomposition products are formed including gases and high boiling polymer products sometimes called high boilers. In a neutronic reactor using the compositions of the invention as moderators and/or coolants these high boilers steadily build up in the fluid, and they can be tolerated up to about 30% in the fluid without a substantial decrease in heat transfer. It is preferred at least for nuclear reactor moderator and/or coolant use that the percentage of high boilers in the fluid not exceed about 50%, more preferably about 40%.

It is an object of this invention to provide new and useful reactor moderators and/or coolants stabilized against residue formation at high temperatures due to radiation.

It is another object of this invention to provide a radiation-stable coolant usable at high temperatures in a system wherein radiation is present.

It is another object of this invention to provide a radiation-stable hydraulic fluid usable in a system wherein radiation is present.

It is another object of this invention to provide new low cost neutronic reactor moderators and/or coolants.

It is another object of this invention to provide new compositions of matter having improved stability at high temperatures against residue formation when used as neutronic reactor moderators and/or coolants.

It is another object of the invention to provide new compositions stabilized at high temperatures against radiation decomposition resulting in the formation of residue products.

These and other objects of the invention will become apparent as the detailed description of the invention proceeds.

An illustrative but non-limiting listing of polyphenyls stabilized by rosin acids against residue formation from radiation and which are usable neutronic reactor moderators and coolants are the following: biphenyl, o-terphenyl, m-terphenyl, p-terphenyl, methylbiphenyl, dimethylbiphenyl, ethylbiphenyl, n-propylbiphenyl, isopropylbiphenyl, diisopropylbiphenyl, n-butylbiphenyl, isobutylbiphenyl, diisobutylbiphenyl, t-butylbiphenyl, di-t-butylbiphenyl, amylbiphenyl, hexylbiphenyl, methyl-o-terphenyl, diethyl-m-terphenyl, n-propyl-p-terphenyl, isopropyl-o-terphenyl, isopropyl-m-terphenyl, isopropyl-p-terphenyl, diisopropyl-o-terphenyl, diisopropyl-m-terphenyl, diisopropyl-p-terphenyl, n-butyl-o-terphenyl, isobutyl-o-terphenyl, isobutyl-m-terphenyl, diisobutyl-p-terphenyl, t-butyl-o-terphenyl, t-butyl-m-terphenyl, t-butyl-p-terphenyl, di-t-butyl-o-terphenyl, di-t-butyl-m-terphenyl, di-t-butyl-p-terphenyl, n-amyl-o-terphenyl, n-hexyl-m-terphenyl, etc. The location of the lower alkyl group or groups on polyphenyl rings includes all possible positions and combinations.

Of the compounds named specifically above biphenyl or the terphenyls are desirable in being the least expensive, and they are usable in spite of their high pour points, although they tend to cause trouble in use with freezing up of lines particularly during temporary shutdowns. Mixtures of the terphenyl isomers available commercially under the trademark "Santowax R," are quite satisfactory. To obtain coolants and modifiers having low pour point characteristics biphenyl, a terphenyl, or mixed terphenyl isomers are alkylated to preferably add one or two isopropyl or t-butyl groups. Especially desirable as coolants and moderators are mixtures of mono- and di-t-butylated o-, m- and p-terphenyl isomers having not more than about 50% by weight of t-butylated p-terphenyl isomer, which has a relatively high pour point as compared to the o- and m-isomers. "Santowax R" is a suitable raw material source to alkylate in preparing said t-butylated mixture.

As neutronic reactor moderators and/or coolants the polyphenyls named in the two paragraphs immediately above can be used either singly or in admixture with others. The alkylated biphenyls and terphenyls can be made by methods which are illustrated in copending application Serial No. 727,999, filed April 11, 1958. To make methyl alkylated polyphenyl it is desirable in the alkylation process to operate under pressure since methyl bromide is a gas at room temperature. Normally under proper operating conditions, alkylation will result in a mixture which will be primarily monoalkyl- and dialkyl-polyphenyls, although minor amounts of tri- and higher polyalkylated products will be formed. In the polyalkyl-polyphenyls the relative position of the alkyl groups is not critical, and the alkylation products can be used as is for reactor coolants and moderators with the added rosin acids stabilizer, of course; however, it may be preferred to use distillation to separate out the desired mono- and dialkyl portions. The alkylation process, of course, will result normally in a mixture of isomers wherein the alkyl groups are located in ortho-, meta- and para-positions on the polyphenyl nucleus. The single isomer could be used as neutronic reactor coolants and moderators, but actually it is preferred to use the mixed isomers.

Suitable fused-ring aromatics usable in the invention can be derived from the catalytic cracking of coal oil fractions, petroleum oil fractions and/or shale oil fractions which are broadly defined as oleaginous materials; however, the preferred source is petroleum fractions at the present time. It is quite conceivable that in time shale oil fractions will be the preferred source as rich crude petroleum oil is used up and/or as shale oil processing is improved, since tremendous deposits of shale useful for the production of oil are known to exist. It is possible although not as likely due to economic consideration that the preferred source will be coal oil fractions derived from hydrogenation or other processing operations on coal to produce crude coal oil. These fused-ring aromatics which can be recovered, e.g., by solvent extraction of the still bottoms of a catalytic cracking unit, are a mixture of fused-ring aromatic compounds primarily tricyclic and higher polycyclic with minor amounts of bicyclic nuclei. These compounds or some of them will in some cases have alkylated substituents on the rings, particularly methyl groups; and, they will in some cases be compounds having fused heterocyclic rings with sulfur or nitrogen as components of the hetero ring. Fused-ring aromatic hydrocarbons are well known and are also available from other well known sources and can be used either singly or in mixtures.

Tall oil useful in the compositions of the invention is a by-product of the pulping of pine wood by the sulfate or soda processes. It is a mixture of resin and fatty acids, sterols and resenes. The name "Talloel" was given to this product by Swedish investigators and signifies "oil of pine"; this has been translated as tall oil and is also known as liquid rosin or rosin oil.

The sulfate soap which separates from the black liquor of pulping pinewood yields from 50 to 100 pounds of tall oil for each ton of pulp produced. This represents about 33% of the total resin and fatty acids in the freshly cut pine wood; the remainder is lost during the storage period of the wood, the pulping operation and the solubility of the soap in the black liquor.

Tall oil has been an article of commerce for a number of years. The following is a typical analysis of tall oil:

[Basis 100 lbs. of crude tall oil]

| Material | Composition | Lbs. |
|---|---|---|
| Light Unsaponifiable | | 3.8 |
| Fatty Acids | Palmitic Acid | 4.8 |
| | Stearic Acid | 0.4 |
| | Oleic Acid | 17.5 |
| | Linoleic Acid | 13.7 |
| | Conjugated Linoleic Acid | 3.7 |
| Rosin Acids | Abietic Acid | 19.0 |
| | Dehydroabietic Acid | 9.6 |
| | Dextropimaric Acid | 12.0 |
| | Isoabietic Acid | 6.7 |
| | Levopimaric Acid | 0.5 |
| Neutral Material | | 5.8 |
| Heavy Unsaponifiable | | 2.5 |
| Total | | 100.0 |

When tall oil is distilled in commercial vacuum distillation about 10% bottoms or residue fraction usually results and the residue fraction will not normally be above about 15%. These bottom fractions and portions thereof are also very good radiation stabilizers for polycyclic aromatic hydrocarbons as will be seen in data which is described hereinbelow.

To test the radiation stability of the compositions of the invention representative samples of m-terphenyl and m-terphenyl with rosin acids therein were irradiated with high energy electrons using a Van de Graaff generator as the source of radiation.

A typical control experiment is illustrated as follows: 7 g. of m-terphenyl was charged to a stainless steel reactor provided with suitable inlet and outlet ports and a thin titanium window to admit the radiation. After the sample was added to the reactor, the reactor was flushed with nitrogen and then connected to a gas collecting bottle. The material was irradiated with the Van de Graaff electron source at 2 million electron volts (m.e.v.) and 250 microamperes ($\mu$a.), for a total irradiation time of 280 minutes. The reactor was maintained at a temperature of 400° C., the thermocouple being placed in the coolest portion of the liquid. The radiation power input to the irradiated sample during the test was 20 watt-hours per gram of sample. Actually a number of different samples were irradiated simultaneously in separate reactors and in each run one or more of these samples was a control sample. The individual reactors were mounted in openings in a metal block which was electrically strip heated to maintain the temperatures of the reactor at 400° C. (752° F.).

To determine the net residue formation in the irradiated samples distillations were made of representative aliquots of the samples before and after irradiation. Conditions of distillation were adjusted so only the high boiling residues would remain in the distillation pot. A cylindrical aluminum block having 4 cylindrical openings extending from one end to about three quarters of the length of a block was the heating source of the distillation apparatus. A resistance heating jacket was wrapped around a portion of the block not having the openings therein. The distillation flask was a test tube closed at the top having a side take-off arm for the distillate removal. The block was, of course, positioned with openings up for use. The openings in the aluminum block were not much larger than the outer diameter of the flask so the block heating surface fits quite closely around the flask. Slots were cut length-wise along the sides of the aluminum block beginning at the end having the opening to accommodate the take-off arm of the flask and allowed the flask to be seated well down in the opening of the block. Vacuum distillation of the sample (about 1 gram) was carried out over a period of two hours at a pot temperature of about 200° C. and a head temperature of about 170° C. determined by measurement in the block at appropriate points and using <0.5 mm. of Hg pressure.

Residue determination similar to the control run described above were made for the other control samples and the samples containing the rosin acids stabilizers before and after irradiation. From these data percent residue reduction as compared to the m-terphenyl control is calculated using the following formulas:

$$\text{Percent blank} = \frac{\text{sample residue weight, before irradiation}}{\text{sample weight}} \times 100$$

$$\text{Percent residue} = \left[\frac{\text{sample residue weight, after irradiation}}{\text{sample weight}} \times 100\right] - \text{percent blank}$$

$$\text{Percent residue reduction} = \frac{\text{percent residue of control} - \text{percent residue of sample}}{\text{percent residue of control}} \times 100$$

The data are summarized in the following table:

| Sample | Percent Residue Reduction |
|---|---|
| m-Terphenyl+4.9% tall oil | 25.5 |
| m-Terphenyl+4.5% abietic acid | 35.0 |
| m-Terphenyl+4.7% commercial gum rosin | 30.6 |
| m-Terphenyl+5.0% tall oil still bottoms [1] | 45.5 |
| m-Terphenyl+3.9% unsaponifiables from tall oil still bottoms [2] | 38.8 |
| m-Terphenyl+3.7% saponifiables from tall oil still bottoms [2] | 30.1 |

[1] A 10% residuum or still bottoms fraction from the vacuum distillation of a typical commercial tall oil.
[2] About ⅓ of the residuum was unsaponifiable and the balance saponifiable.

It is seen from the data of the table above that rosin acids are effective radiation stabilizers for polyphenyls. A number of different sources of rosin acids and fractions thereof were tested, and it is seen from the data that they are all effective radiation stabilizers at relatively low concentrations. Similarly they are effective radiation stabilizers at high temperatures for fused-ring aromatic hydrocarbons.

*Use of Rosin Acids-Terphenyl Mixture as a Moderator and Coolant in a Power Reactor*

The particular rosin acids to be used in this specific embodiment is the 10% residue fraction from tall oil distillation. The coolant mixture is 20% residuum and 80% "Santowax R." Suitable abietic acid, tall oil per se or other rosin acids can be used. A typical power reactor is illustrated diagrammatically in the flow sheet shown in the accompanying drawing.

In the drawing, numeral 10 indicates a cylindrical reactor shell constructed preferably of steel. Within the shell 10 is arranged a reactor core 11, which consists of plates of enriched uranium of such number, size, shape and composition as to be capable of becoming critical upon the addition of the organic moderator-coolant of the invention. Surrounding the cylindrical shell 10 is a cylindrical reflector shell 12, which is also constructed of steel and which contains liquid reflector material, which can alternatively be a solid reflector material, if desired. In the reactor core are inserted the usual control systems, indicated by numerals 52 and 53, the construction of which and use thereof is described in the Fermi et al. patent, referred to hereinabove.

Numeral 13 indicates a disengager or gas trap, which is merely a device for separating gas from liquid. The disengager is connected with the reactor shell 10 by pipe 14. The gas which is separated from the liquid coolant in 13 flows out by means of pipe 15, connected to pressure controller 16, which in turn is connected to condenser 17 by pipe line 18. Condenser 17 carries a discharge line or vent 19, permitting the discharge of gases to the atmosphere.

Liquid coolant flows from disengager 13 through line 20 into pump 21 by means of which the coolant is circulated into and through heat exchanger of boiler 22 via line 23. Leaving heat exchanger 22 by pipe 24 the coolant, now reduced in temperature, is returned to reactor shell 10 by line 24. Branch lines 25 carry the coolant into reflector shell 12 and thence by pipe 26 back into the main stream flowing into pipe 14.

Pipe line 27 carries a small stream of coolant from pipe 24 either into filter 28 via pipe 29, thence returning the flow of filtrate by pipe 30 to the main stream flowing in pipe 24, or by means of pipes 31 and 32 into purification still 33. Heating coil is the reboiler section of still 33 provides the necessary heat for distillation, the liquid returning thence to pipe 24 by means of pipe 35.

Liquid coolant which is fed to still 33 flows through pipe 32 and enters the still first passing pressure reducing valve 36, by which means the flow is controlled to that required to keep the high boiling components at the desired level. Still 33 can operate at reduced or atmospheric pressure. The distillate in vapor form leaves the still by pipe 37 entering condenser 17, where the vapors are liquefied, the liquid resulting therefrom flowing through pipe 38 into pump 39 and being thereby returned by pipe 40 to the main stream flowing in pipe 20. Makeup liquid coolant is introduced into tank 41 and flows by pipe 42 into pipe 38 and thence into pump 39.

Purification still 33 may be operated continuously or intermittently as desired. It is, of course, desirable to keep the high boiling decomposition products in the circulating liquid as low as possible in view of the adverse effects of these products on viscosity and heat transfer. Amounts of such high boiling decomposition products usually in the neighborhood of 5–30% by weight of the liquid can be tolerated without a substantial decrease in the heat transfer coefficient. After the high boiler content has reached a predetermined value (as determined by distillation of a sample), the purification still is placed in operation and a constant stream of coolant is withdrawn from the system into the still 33 where it is distilled. The distillate passes into condenser 17, where it is condensed and is then returned to the system by means of pump 39 as above described. The high boilers are removed from still 33 by means of pipe 45 containing valve 46 and are thenceforth discarded.

Heat energy is withdrawn from the liquid coolant circulating in the heat exchanger or boiler 22 in any manner desired. In one method of operation, boiler feed water is introduced by means of pipe 50 and steam is generated under pressure within boiler 22 withdrawn at pipe 51 and supplied to a steam turbine or other prime mover. The condensate produced in the conventional condenser forming part of the prime mover will again be returned to the boiler. It is, of course, not necessary that water be used, since a suitable thermally stable organic liquid may serve the same purpose and obviate the hazards encountered with accidental leakage of water into the coolant-moderator system. The further utilization of the energy obtained in this manner from a nuclear reactor is well known to those skilled in the art and forms no part of the present invention.

The system is filled with an inert gas such as nitrogen or helium, so as to eliminate traces of air and moisture pending the introduction of the coolant-moderator charge. The system is now loaded with the coolant-moderator by introduction to supply tank 41, from which point it is permitted to flow into and through the pipe lines and various pieces of equipment completely filling the same with the exception of still 33 and condenser 17 which are not filled. The system is filled to the point where the disengager is approximately one-half full. Pump 21 is activated, the control devices in the reactor adjusted to release power in such an amount as to raise the temperature of the coolant-moderator in the system to a temperature in the range of about 300 to 450° C., preferably between about 350 and 425° C.; however, it is possible higher temperatures will be desirable. Heat is extracted from the heat exchanger or boiler in the manner described above.

Radiolytic damage to the fluid as evidenced by the accumulation of gases in disengager 13 and also by the formation of high boiling hydrocarbons in the liquid. As the amount of gas increases in the closed system, the pressure rises to the desired value, after which it is continuously or intermittently withdrawn through pressure control valve 16. Withdrawal of gas is controlled at such a rate so as to maintain the system under a pressure which is sufficiently high as to minimize vapor formation in the hottest part of the system. This hottest part of the system is adjacent to the fuel elements in reactor 11. Decrease of density occurring as a result of increase in temperature will result in some loss of moderation by reason of the fewer hydrogen atoms per unit volume of coolant. Such decrease in moderation will, to some extent, damp out the nuclear reaction and can be compensated by adjustment of control devices.

The discharge of gases attending the maintenance and the regulation of pressure upon the system will carry out some organic coolant-moderator in vapor form. In order to recover such coolant-moderator the gases are discharged into condenser 17, wherein they are cooled by contact with cooled surfaces maintained at a low temperature by means of cooling water. Condensed liquid organic coolant moderator will be returned by pipe 38, the valve therein now being opened into the suction side of pump 39 and thence returned to the circulating system.

The high boiling tar-like material formed concomitantly with the gases by the effect of radiation should also be removed or maintained at a desirably low level. This is done by the withdrawal via lines 27, 31 and 32 and reducing valve 36 of a constant stream of liquid flowing to still 33. Still 33 operates under reduced or atmospheric pressure as a result of which the contents can be boiled by means of a side stream of fluid passing to heating coil 34, located within the reboiling zone of still 33. The distillate leaving the still passes by line 37 also into condenser 17. The condensate is mixed with that derived from the disengager discharger vapors and is then returned by pump 39 to the system.

Removal of solid particles from the interior walls of the system which become suspended in and are carried by the circulating liquid is best done by the provision of a filter 28 located in the system as shown in the drawing. Such filter is supplied by line 29 and the filtrate returned by line 30 to the system. The pressure drop across the filter may be overcome by means of a suitable pump installed in either of these lines. By this means the induced radioactivity in the suspended foreign materials in the circulating fluid can be maintained at a low value.

Not only are the rosin acids polyphenyl mixtures usable as coolants and moderators in neutronic reactors, but they are also useful as coolants in any system employing radiation wherein the coolant must necessarily be subjected to radiation. For example, large food irradiators employing Co-60, Cs-137, spent fuel rods, or high intensity γ-radiation or β-radiation using a fluid in hydraulic controls could very usefully employ rosin acids stabilized polyphenyls as the hydraulic fluid.

Also, the rosin acids of the invention are useful as radiation stabilizers for the poly(oxyphenylene)benzenes, and particularly for these ethers of the formula

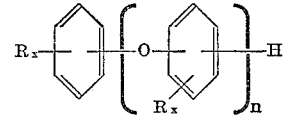

wherein $n$ is an integer from about 3 to about 8, R is an alkyl radical having below about 5 carbon atoms, i.e., methyl, ethyl, n-propyl, isopropyl, n-butyl, isobutyl, t-butyl or mixture thereof, an $x$ is an integer from 0 to 4. These stabilizers would be incorporated in the polyethers in less than equal amounts by weight based on the polyethers, preferably not more than about 10% by weight, and suitably of the order of about 5% by weight.

Although the invention has been described in terms of specified apparatus and materials which are set forth in considerable detail, it should be understood that this is by way of illustration only and the invention is not necessarily limited thereto, since alternative embodiments and operating techniques will become apparent to those skilled in the art in view of the disclosure. Accordingly, modifications are contemplated which can be made without departing from the spirit of the described invention.

What is claimed is:

1. In a system employing radiation selected from the class consisting of alpha, beta, X-rays, gamma-rays, neutrons and mixtures thereof and a fluid subjected to said radiation at high temperatures, the improvement wherein said fluid comprises polycyclic aromatic hydrocarbons and not more than about 50% by weight based on said polycyclics of rosin acids at least sufficient to reduce the radiolytic damage in said polycyclic aromatic hydrocarbons.

2. A system of claim 1 wherein said polycyclicaromatic hydrocarbons are terphenyls.

3. A system of claim 2 wherein said rosin acids are abietic acid.

4. A system of claim 2 wherein said rosin acids are tall oil.

5. A system of claim 2 wherein said rosin acids are the distillation residue of tall oil consisting of not more than about 15% of the tall oil.

6. The system of claim 5 wherein only a portion of the tall oil distillation residue is used which is the unsaponifiable portion thereof.

7. A system of claim 5 wherein said rosin acids are the saponifiable portion of said tall oil residue.

8. A neutronic power reactor in which the coolant for fuel elements comprises a mixture of polycyclic aromatic hydrocarbons and not more than 50% by weight based on said polycyclics of rosin acids at least sufficient to reduce radiolytic damage in said polycyclic aromatic hydrocarbons.

9. A neutronic power reactor in which the neutron moderator comprises a mixture of polycyclic aromatic hydrocarbons and not more than 50% by weight based on said polycyclics of rosin acids at least sufficient to reduce radiolytic damage in said polycyclics.

10. In a neutronic heating process wherein heat generated within a liquid cooled neutronic reactor is removed from the fuel elements therein and conveyed to a heat exchanger, the improvement which comprises effecting said removal and conveyance of heat by means of a liquid comprising a mixture of polycyclic aromatic hydrocarbons and not more than 50% by weight based on said polycyclics of rosin acids at least sufficient to reduce radiolytic damage in said polycyclics.

References Cited in the file of this patent

UNITED STATES PATENTS

| | | |
|---|---|---|
| 1,945,543 | Weber | Feb. 6, 1934 |
| 2,346,947 | Schlaanstine | Apr. 18, 1944 |
| 2,358,207 | Borglin | Sept. 12, 1944 |
| 2,462,631 | Gittings et al. | Feb. 22, 1949 |
| 2,588,970 | Esposito | Mar. 11, 1952 |
| 2,845,361 | Maddox | July 29, 1958 |
| 2,861,894 | Franck | Nov. 25, 1958 |

FOREIGN PATENTS

| | | |
|---|---|---|
| 831,369 | Great Britain | Mar. 5, 1960 |